Patented May 6, 1930

1,757,431

UNITED STATES PATENT OFFICE

GEORG KALISCHER, OF FRANKFORT-ON-THE-MAIN, AND WERNER ZERWECK, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

CONDENSATION PRODUCT AND PROCESS OF MAKING SAME

No Drawing. Original application filed July 8, 1926. Serial No. 121,283, and in Germany July 20, 1925. Divided and this application filed January 31, 1928. Serial No. 250,952.

This application is a division of our application Serial No. 121,283, filed July 8, 1926.

We have found that new and valuable condensation products are obtainable by treating a compound of the general formula:

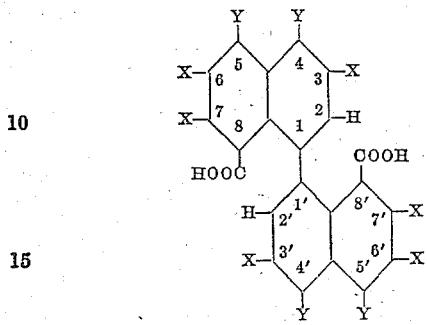

(wherein the X's stand for hydrogen atoms, of which one or more may be replaced by a monovalent substituent, the Y's stand for hydrogen atoms, which may be replaced by halogens), with an acid condensing agent at moderate conditions, until the reaction product is soluble in glacial acetic acid, and heating the benzobenzanthrone-carboxylic acid compound, thus obtained with an alkaline condensing agent.

The new condensation products correspond probably to the general formula:

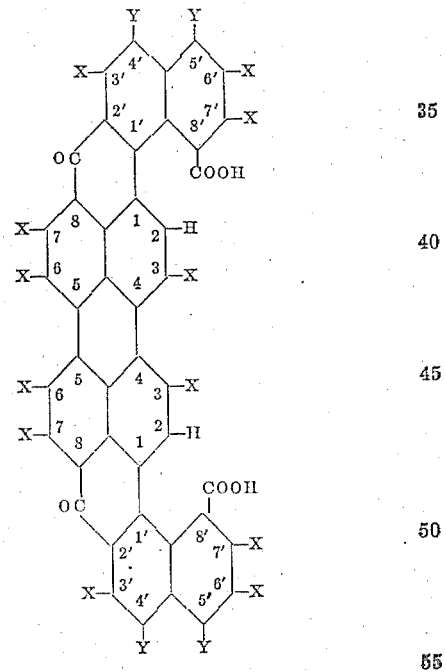

(wherein the X's stand for hydrogen atoms, of which one or more may be replaced by a monovalent substituent; the Y's stand for hydrogen atoms, which may be replaced by halogens).

In order to further illustrate our invention the following examples are given; we wish it however to be understood that our invention is not limited to the particular examples given nor to the specific conditions mentioned. The parts are by weight and all temperatures in centigrade degrees.

*Example 1*

10 parts of 1.1'-dinaphthyl-8.8'-dicarboxylic acid are boiled under a reflux condenser while stirring with about 200 parts of glacial acetic acid and about 20 parts of anhydrous zinc chloride, until the starting material is dissolved. After diluting the solution with water, benzobenzanthronecarboxylic acid, thus formed, separates.

At about 95° 10 parts of benzobenzanthronecarboxylic acid are introduced into a mixture of 100 parts of caustic potash and 60 parts of alcohol. The temperature of the mass is maintained for some hours. Then the mass is dissolved in water and the solution is treated with air or another suitable oxidizing agent in order to oxidize the formed leucocompound of the condensation product. From the blue solution, thus obtained, the condensation product is isolated in the usual manner either by precipitating with an acid or by adding common salt to the solution. The new carboxylic acid compound is when dry a blue powder, easily soluble even in a diluted solution of carbonate of soda. The solution in cold concentrated sulfuric acid is green colored, turning to olive, when warmed. With an alkaline hydrosulfite solution a blue solution is obtained, having a red fluorescence.

By using a derivative or a substitution product of benzobenzanthrone carboxylic acid analogous condensation products of similar properties are obtainable.

*Example 2*

10 parts of benzobenzanthrone-carboxylic acid and 20 parts of pulverized caustic potash are boiled for about 6 hours under reflux with 120 parts of pyridine, while stirring. After diluting the mass with water the pyridine is expelled by steam and the alkaline solution is worked up as described in Example 1.

The compound, thus obtainable, is identical with the product prepared according to Example 1.

By using other solvents or diluents, such as aniline, dimethylaniline, naphthalene, the same result is obtainable. Also the caustic potash may be replaced by other alkaline condensing agents, such as aniline-sodium, sodium-amide, sodium-alcoholate.

We claim:

1. As new products the compounds of the general formula:

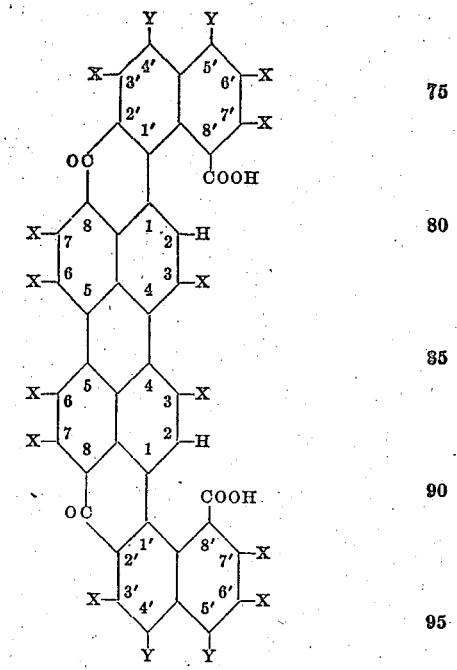

(wherein the X's stand for hydrogen atoms of which one or more may be replaced by a monovalent substituent, the Y's stand for hydrogen atoms, which may be replaced by halogens) which are when dry dark blue to dark green powders, insoluble in water, easily soluble in alkalies to a blue to greenish blue solution, soluble in concentrated sulfuric acid to a greenish solution and soluble in an alkaline hydrosulfite solution to a blue to greenish blue solution.

2. The process which comprises treating a compound of the probable general formula:

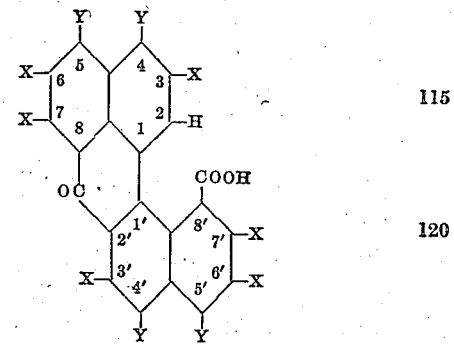

(wherein the X's stand for hydrogen atoms, of which one or more may be replaced by a monovalent substituent, the Y's stand for hydrogen atoms, which may be replaced by halogens) with an alkaline condensing agent.

3. As a new product the compound of the probable formula:

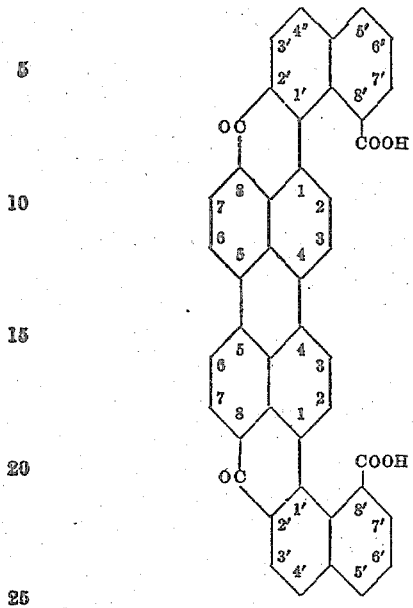

which is when dry a blue powder insoluble in water, easily soluble in alkalies, soluble in concentrated sulfuric acid to a green solution, turning to olive when warmed, and yielding with an alkaline hydrosulfite solution a blue solution showing a red fluorescence.

4. The process which comprises heating a compound of the general formula:

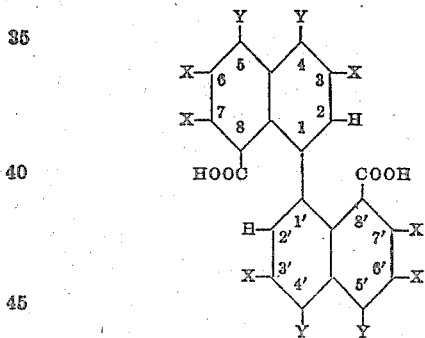

wherein the X's stand for hydrogen atoms of which one or more may be replaced by a monovalent substituent and the Y's stand for hydrogen atoms which may be replaced by halogen, with zinc chloride in boiling glacial acetic acid solution until the starting material is dissolved and then treating the reaction product with an alkaline condensing agent.

In testimony whereof, we affix our signatures.

GEORG KALISCHER.
WERNER ZERWECK.